Figure 1:
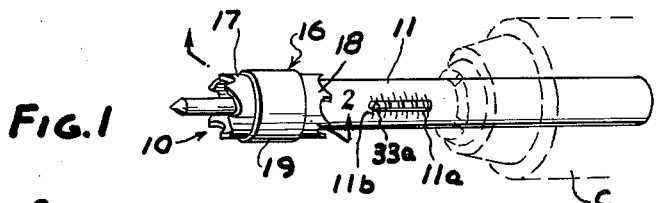

Sept. 24, 1963 E. D. HOUGEN 3,104,564
ARTICLE FOR SEPARATING SPOT WELDED PANELS
Filed Dec. 5, 1960

INVENTOR.
EVERETT D. HOUGEN
BY
Barney, Kisselle, Raisch & Choate
ATTORNEYS

United States Patent Office 3,104,564
Patented Sept. 24, 1963

1

3,104,564
ARTICLE FOR SEPARATING SPOT WELDED PANELS
Everett D. Hougen, Box 174, Flushing, Mich.
Filed Dec. 5, 1960, Ser. No. 73,590
8 Claims. (Cl. 77—69)

This invention relates generally to metal-working tools, and more particularly to a rotary cutting tool for disconnecting metallic members which are originally joined together by one or more spot welds.

In the art of repairing and refinishing collision damaged sheet metal parts of automotive vehicles, such as the body panels and fenders thereof, it is often necessary to remove the damaged panel from the vehicle in order to straighten or otherwise recondition the same. When the sheet metal panels are joined together by spot welds, the damaged panel has hitherto been separated from the undamaged panel either by drilling a hole of sufficient diameter through both panels so that the entire spot welded portions of the panels are removed, or by splitting the spot-welded seam apart by driving a thin sharp chisel between the two panels.

Both methods have disadvantages. In the former, it is necessary to center punch the spot weld in order to properly position and start the drill in true position. Drilling out the entire spot welded portions of both panels consumes excessive time and power, and it is practically impossible to make overlapping drillings when two spot welds are located close together. Moreover, in re-joining the repaired panel to the undamaged panel, the presence of holes in both of these panels requires the use of sophisticated, high temperature welding tools and techniques often unavailable in the average body shop. In the chisel method of separating the panels, the undamaged as well as damaged panels are often distorted and bent, adding to the labor and cost involved in making the repair.

Accordingly, it is an object of the present invention to provide a rotary cutting tool for separating two metallic members joined by a spot weld by a method in which a minimum of metal is removed without distorting the members, thereby reducing the time, power and expense required to effect the separation.

Another object is to provide an improved tool for quickly cutting apart sheet metal panels that are spot welded together and which enables the panels to be rejoined in a manner which facilitates accurate re-alignment of the members during re-assembly thereof and enables the use of low temperature rewelding or brazing tools and techniques available at low cost and easily mastered by body shop personnel.

A further object is to provide an improved self-centering rotary tool of the tubular saw type for removing a minimum of metal when separating two spot welded panels, which tool is simple in construction and which may be easily adjusted to cut to any predetermined depth within the range of adjustment of the tool.

Figure 2:
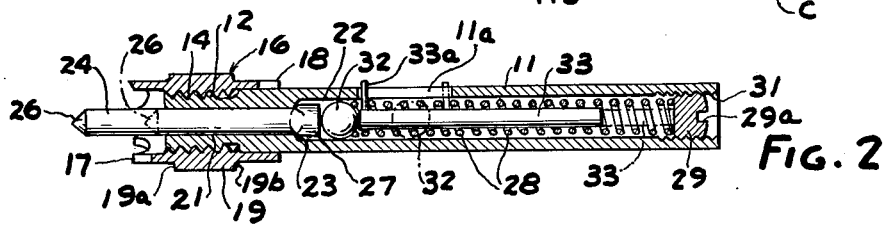
Figure 3:
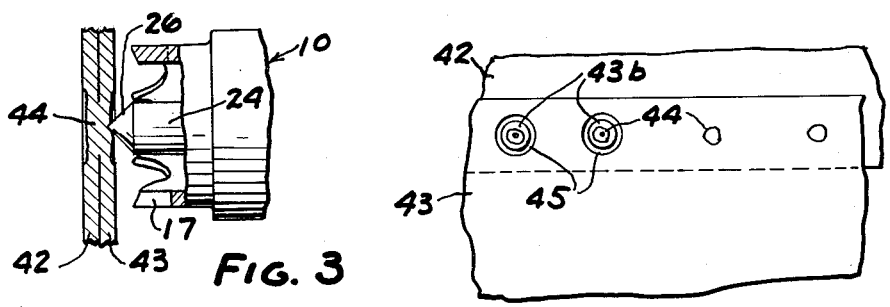
Figure 6:
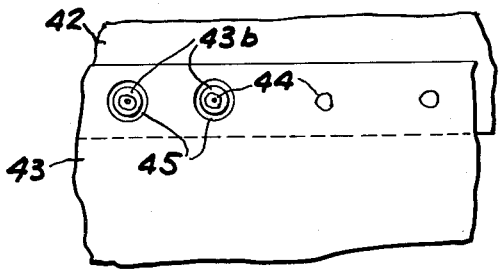
Figure 4:
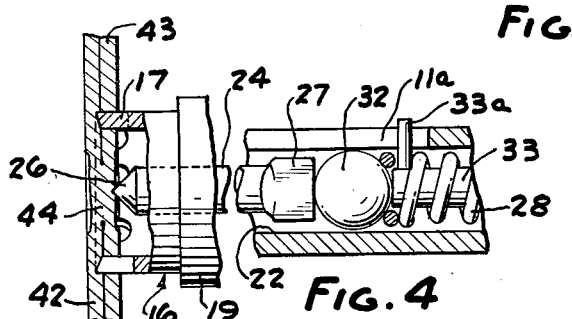
Figure 7:
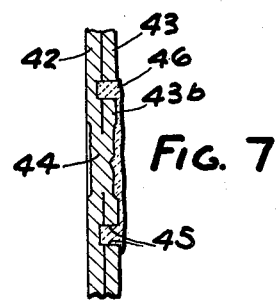
Figures 5, 8:
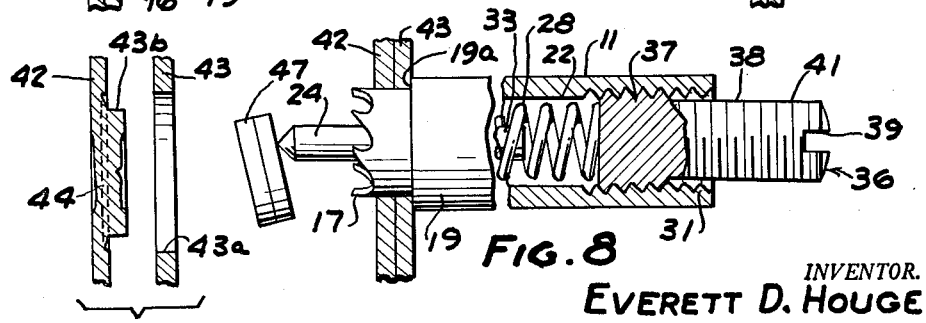

In the accompanying drawing:
FIG. 1 is a perspective view of the rotary cutting tool of the invention received in a suitable chuck;
FIG. 2 is a longitudinal section of the rotary cutting tool taken on line 2—2 of FIG. 1;
FIG. 3 is a fragmentary elevational view, partially in section, illustrating the step of separating two panels spot welded together by utilizing the tool of the invention;
FIG. 4 is a fragmentary elevational view partially in section illustrating the completion of the step shown in FIG. 3;
FIG. 5 is a fragmentary sectional view of the panels disconnected from one another and with the tool removed;
FIG. 6 is a fragmentary elevational view of a portion of the overlapping spot welded seam along which the panels are joined together, with encircling grooves cut around two of the spot welds thereof;
FIG. 7 is a fragmentary elevational view in section of the two panels re-assembled;
FIG. 8 is a fragmentary elevational view of a modification of the tool of the invention illustrating its use as a hole cutter.

The rotary cutting tool 10 of the invention (FIGS. 1 and 2) includes a cylindrical body or arbor 11 which is adapted to be received in suitable tool holding means of a rotary power supplying device, such as a chuck C of an electric hand drill, not otherwise shown. The forward end portion of arbor 11 is provided with external threads 12 which mate with internal threads 14 of a double-ended cylindrical cutter blade 16 removably received on the end of the arbor.

Cutter blade 16 is made in the form of a sleeve with a plurality of cutting teeth 17 and 18 formed in the respective peripheral end edges thereof. Cutting teeth 17 and 18 are shaped for high speed metal cutting in accordance with known design, but are reversed with respect to one another so that cutter blade 16 is reversible, thus permitting cutting teeth 18 to be used after cutting teeth 17 have become dulled from use. The central portion of cutter blade 16 is provided with an integral flange 19 which provides radial shoulders 19a and 19b spaced axially inward from cutting teeth 17 and 18 respectively, this spacing being determined by the maximum penetration for which the cutter blade 19 is designed.

Arbor 11 has an axial bore 21 formed in the forward portion thereof which opens into a counterbore 22 coaxial with bore 21, providing a shoulder 23 therebetween. A pilot rod 24 having a conical point 26 at the forward end thereof made of high speed steel is received with a close sliding fit in bore 21 for centering the rotary cutting tool over the portion of the material to be cut. The rear end of rod 24 is upset to form an enlarged portion 27 which abuts shoulder 23 to limit forward travel of pilot rod 24.

Pilot rod 24 is urged to a fully extended position (FIG. 2) by means of a resilient member comprising helical compression spring 28 slidably received in counterbore 22. The rear end of spring 28 abuts an externally threaded plug 29 threadably received in internal threads 31 provided at the rear of counterbore 22. Plug 29 is provided with a transverse slot 29a adapted to receive a screw driver for use in axially adjusting the plug. A bearing ball 32 rides with a rolling, sliding fit in counterbore 22 between the forward end of spring 28 and enlarged portion 27 of pilot rod 24 to form an anti-friction seat therefor. Rearward travel of bearing ball 32, and hence pilot rod 24, is positively limited by the provision of a spacer rod 33 slidably received within spring 28. Spacer rod 33 is cut to a predetermined length so that when plug 29 is adjusted axially to the rear of arbor 11, the conical point 26 of pilot rod 24 may retract flush with the forward end of arbor 11 (dotted line showing, FIG. 2).

If desired the axial position of spacer rod 33 may be indicated by a projecting portion 33a on the forward end of spacer rod 33. Projection 33a extends perpendicularly from rod 33 through the space between adjacent convolutions of spring 28 and through an axial slot 11a formed in the side of arbor 11. Suitable graduations 11b are marked or scribed on the outer surface of arbor 11 along the longitudinal edges of slot 11a to form a depth gauge useful in indicating the axial distance which pilot rod 26 can move during retraction thereof before it is stopped by bearing ball 32 bottoming against rod 33 and the latter bottoming against plug 29.

A modified form of depth gauge is shown in FIG. 8. In this embodiment there is no projection provided on spacer rod 33 and arbor 11 need not be slotted. Instead, a gauge plug 36 is provided in lieu of plug 29. Plug 36 has an externally threaded portion 37 adapted to be received in the internal threads 31 of counterbore 22. Integral with threaded portion 37 and extending rearwardly therefrom is an unthreaded cylindrical portion 38 which projects beyond the end of arbor 11 and terminates with a screw driver slot 39. Suitable graduations 41 are provided on the outer surface of portion 38 to visibly indicate the axial position of plug 36.

To set the depth of penetration of cutting teeth 17, either form of tool 10 is brought up against the surface of the portion of the work to be cut so that point 26 of pilot rod 24 is retracted flush with the leading edges of cutting teeth 17. Plugs 29 or 36 are then screwed axially into arbor 11 until pilot rod 24, bearing ball 32 and spacer rod 33 abut one another. Plugs 29 or 36 are then rotated in the reverse direction to move the same axially rearward a distance equal to the depth of cut desired. This distance is easily read by observing the registry of graduations 11b with projection 33a, or of graduations 41 with respect to the rear face of arbor 11. Of course, cutting tool 10 may be constructed without depth gauging structures such as projection 33a and extension 38, in which case the depth of penetration may be set rather accurately by observing the axial position of plug 29 and performing one or two test cuts, depending upon the skill of the operator.

The operation of rotary cutting tool 10 will become more apparent in the following description of the method of the invention for disconnecting and rejoining two metallic members spot welded together. Referring first to FIG. 3, a pair of sheet metal panels 42 and 43 are shown joined together by a spot welded portion 44 thereof. The thickness of the panel to be removed is determined, and the screw plug 29 of the rotary cutting tool 10 is adjusted to penetrate at least all the way through this panel. With tool 10 thus adjusted it is brought perpendicular to the surface of panel 43 with the conical point 26 against the center of the spot welded portion 44. Tool 10 is then pushed lightly against the panel, causing the pilot rod 24 to retract against the force of spring 28 until cutting teeth 17 contact panel 43. Due to the anti-friction bearing ball 32, pilot rod 24 is free to remain fixed against rotation when rotary motion is imparted to the cutting tool simultaneously with the application of the cutting teeth to the panel.

As shown in FIGS. 4–6, upon application of moderate pressure cutting teeth 17 penetrate panel 43 (and preferably a short distance into panel 42), cutting an annular groove 45 around the periphery of the spot welded portion 44 of the panels. Further penetration of cutting teeth 17 is prevented by pilot rod 26, since further retraction of the pilot rod is prevented by the abutment of the rear face of enlarged portion 27 against bearing ball 32, which in turn, is held against further axial movement by spacer rod 33 bottoming on the forward face of plug 29.

After the cut is completed, the rotary cutting tool is withdrawn and panels 42, 43 separated from one another, as shown in FIG. 5. A circular hole 43a is formed in outer panel 43, while the spot welded portion of panel 43 which remained in the center of the annular cut forms a cylindrical projection 43b on the surface of inner panel 42 since it is still welded thereto. Separation of the panels is made possible by the circular cut around the spot welded portion 44, since the panels are joined together only at the spot welded portion and not at other adjacent portions of the overlapping seam. It is to be understood that the outside diameter of cutter blade 16 measured at cutting teeth 17 must be equal to or larger than the diameter of the spot welded portion 44 to effect separation of the panels. It has been found preferable to use a rotary cutting tool having an arbor of one quarter inches outside diameter so as to fit the quarter inch electric drill found in most body shops, and having a cutter blade with an outside diameter of 5/16 inch so as to encircle most spot welds found on present day cars and trucks. However, if a variation in the diameter of spot welds is encountered, it is a simple matter to change to a cutter blade with a diameter large enough to encircle the spot weld.

After the disconnected panels have been straightened or otherwise reconditioned they may be easily re-assembled in accordance with further steps in the method of the invention. As shown in FIG. 7, panels 42 and 43 are re-aligned with one another in the original connected arrangement thereof merely by relocating projection 43b in hole 43a. After all the projections are thus centered in the respective holes from which they were cut, the panels are temporarily held together by a clamp or other suitable means. Low temperature tools (welding or brazing) are then used to heat the panels around the groove 45 and low melting point welding metal 46 is puddled therein to fuse with and form a bond between the side walls of hole 43a, the surfaces of projection 43b and the bottom of the groove. The freshly cut annular groove 45 simplifies the rewelding of the panels since it provides a well for the molten metal and furnishes a clean, bright metal area for a high strength, low temperature bond.

The rotary cutting tool 10 of the invention is also useful in cutting straight-through holes in metal, such use being shown in FIG. 8. For this type of work, pilot rod 24 is adjusted for full retraction (flush with the forward end face of arbor 11) to permit maximum penetration of cutter blade 16. After the combined thicknesses of the panels 43 and 42 are penetrated, the point 26 will forcibly expel the disk-like portion 47 cut from the panels. Further penetration of cutter blade 16 is prevented by shoulder 19a of flange 19 abutting the face of panel 43, a feature contributing to the ease with which the tool may be withdrawn from the straight-through hole at the completion of the cut. The tool is normally used in this fashion as a conventional hole saw when it is desired to replace the outer panel 43 with a new panel. The hole cut through the inner panel 42 provides a freshly cut well so that welding metal may be more easily applied from the inside of the panels.

Of course, the rotary cutting tool 10 is useful as an ordinary hole cutter in other applications, and in all applications it eliminates the need for center punching due to the provision of the spring loaded pilot rod 24. By axially adjusting threaded plug 29 the tension of spring 28 can be set to produce heavy or light pressure on pilot rod 24 for hole cutting in thick or thin metal respectively. Due to the provision of the centering pilot rod 24, tool 10 facilitates removal of spot welds which are located close to an edge of a panel where ordinary drills tend to slip or "skate" off the panel. The pilot rod also permits overlapping cuts to be easily made with the tool when, for instance, the spot welds are located close together. Less metal is removed when the tubular saw type metal cutter 16 is used instead of a drill, thus hastening the disassembly of spot welded panels. Moreover, in the operation of the tool and in the method of the invention, the cutting occurs in the softest portion of the panels thereby contributing materially to the speed of the operation and the life of the tool. This is due to the fact that the metal in the area of the annular cut has been annealed by the heat generated during spot welding, whereas the surrounding metal remained in its work hardened state while that of the spot welded portion was rehardened by being subjected to more rapid cooling due to the presence of the water-cooled copper electrodes. In addition, by using the method of the invention the panels are not nicked, bent or otherwise damaged as so often occurs when a chisel type tool is used to separate the panels.

I claim:

1. A cutting tool adapted to be received in the tool holding means of a rotary power supplying device for rotation thereby for disconnecting spot welded metal members, including in combination, an arbor having an axial bore extending from one end thereof and a co-axial counterbore extending from the other end thereof providing a shoulder therebetween, a pilot rod slidably received in said axial bore of said arbor and having a pointed forward end portion projecting beyond said one end of said arbor for engaging a spot welded portion of the metal members to center the cutting tool thereon, said pilot rod having an enlarged portion disposed within said counterbore for engaging said shoulder to limit forward sliding movement of said pilot rod, cutting means supported on said arbor at said one end thereof for rotation therewith, said cutting means having a hollow cylindrical portion extending beyond said one end of said arbor with a plurality of cutting teeth formed in the peripheral leading edge of said cylindrical portion for removing a ring of metal from around the spot welded portion of the members, resilient means supported within said counterbore between said pilot rod and said other end of said arbor for urging said forward end portion of said pilot rod beyond said teeth for initially centering the cutting tool, depth stop means disposed within said hollow arbor for positively limiting the retraction of said pilot rod so that said cutting means penetrates to a predetermined maximum depth beneath the surface of the metal, said resilient means comprising a helical compression spring, and said depth stop means including a screw plug threadably received for axial adjustment in said counterbore and against which one end of said spring seats, a bearing ball received in said counterbore with a close rotatable fit between the other end of said spring and the rearward end of said pilot rod to form an anti-friction abutment therebetween permitting relative rotation therebetween, and a rigid stop rod having an axial dimension and diameter less than that of said spring and being received for axial sliding movement therein so that said bearing ball bottoms against said stop rod to limit retractile movement of said pilot rod in accordance with the axial adjustment of said screw plug.

2. The combination as set forth in claim 1 wherein said screw plug includes an externally threaded portion threadably receivable for axial adjustment in said counterbore and an unthreaded portion extending beyond said other end of said arbor and having graduations thereon for visibly indicating the axial position of said screw plug with respect to said other end of said arbor.

3. A tubular saw comprising a cylindrical shank having one end externally threaded and its opposite end internally threaded, said shank having an axial through bore therein which is ensmalled at the externally threaded end of the shank, a cylindrical saw blade threaded over the externally threaded end of the shank, a pilot rod extending axially through the ensmalled portion of the bore and having an enlarged end within the larger bore portion to limit the extent to which the outer end of the pilot rod extends axially outward beyond the free end of the saw blade, a plug threaded into the internally threaded end of the shank for adjustment within said bore toward and away from the opposite ends of the shank and a compression spring acting between said plug and the enlarged end of the pilot rod and yieldably urging the pilot rod axially outwardly of the bore, said cylindrical saw blade having axially extending cutting teeth at the free end thereof and having a radially enlarged shoulder around its outer periphery spaced axially from the cutting teeth, a stop rod extending axially within said spring, said rod having a length less than the axial distance between said plug and the enlarged end of the pilot rod and having one end normally spaced from the plug so that the pilot rod is capable of retracting into said bore against the bias of said spring until such retracting movement is arrested by the stop rod engaging the plug to thereby form an axially solid connection between the plug and the pilot rod, the extent of retraction of the pilot rod being variable in accordance with the axial adjustment of said plug at the internally threaded end of said shank.

4. The combination called for in claim 3 including a bearing ball interposed between the adjacent ends of the pilot rod and the stop rod and forming an anti-friction axial driving connection therebetween which permits relative rotation between the pilot rod and the stop rod.

5. A circular hole saw adapted for mounting on the end of a threaded supporting shank comprising a cylindrical tubular element having an axial through bore, said bore being ensmalled at the central portion of the tubular element and forming radially inwardly projecting annular shoulders spaced axially inwardly from the opposite extremities of the tubular member, said central portion being internally threaded for mounting on the threaded end of a supporting shank and the tubular member being formed with a plurality of axially extending saw teeth at the axially opposite extremities thereof.

6. A circular hole saw as called for in claim 5 wherein said tubular member is formed with a radially enlarged portion around the outer periphery thereof, said radially enlarged portion being located intermediate the axial opposite extremities of the tubular member to form a circumferentially extending shoulder spaced axially inwardly from each end of the tubular member to thereby provide a stop for limiting the maximum penetration of the teeth into the material being cut.

7. A tubular saw comprising a cylindrical shank having one end externally threaded and its opposite end internally threaded, said shank having an axial through bore therein which is ensmalled at the externally threaded end of the shank, a cylindrical saw blade threaded over the externally threaded end of the shank, a pilot rod extending axially through the ensmalled portion of the bore and having an enlarged end within the larger bore portion to limit the extent to which the outer end of the pilot rod extends axially outward beyond the free end of the saw blade, a plug threaded into the internally threaded end of the shank for adjustment within said bore toward and away from the opposite ends of the shank and a compression spring acting between said plug and the enlarged end of the pilot rod and yieldably urging the pilot rod axially outwardly of the bore, said cylindrical saw blade having axially extending cutting teeth at the free end thereof and having a radially enlarged shoulder around its outer periphery spaced axially from the cutting teeth, said saw blade being of tubular form, the blade having an internally threaded portion intermediate its ends which is threadedly engaged with the externally threaded end of the shank, said intermediate portion of the saw blade having a smaller inner diameter than the remainder of the blade and forming an annular shoulder therein, the externally threaded end of the shank defining a shoulder on the shank engageable with the annular shoulder within the blade when the blade is threaded on the shank.

8. A tubular saw comprising a cylindrical shank having one end externally threaded, the externally threaded end of the shank having a diameter smaller than the adjacent portion of the shank to define a shoulder, a tubular saw blade, said blade having an internally threaded portion intermediate its ends which is threadedly engaged with the externally threaded end of the shank, said intermediate portion of the saw blade having a smaller inner diameter than the remainder of the blade and forming an annular shoulder therein which engages said shoulder adjacent the threaded end of the shank, said blade having axially extending cutting teeth at both ends thereof.

References Cited in the file of this patent

UNITED STATES PATENTS

| | | |
|---|---|---|
| 640,108 | Dalzell | Dec. 26, 1899 |
| 1,023,002 | Bennett | Apr. 9, 1912 |
| 1,649,855 | Rairden | Nov. 22, 1927 |
| 1,675,469 | Schreiner | July 3, 1928 |
| 2,711,577 | Leach | June 28, 1955 |
| 2,852,968 | Rowley | Sept. 23, 1958 |

FOREIGN PATENTS

| | | |
|---|---|---|
| 928,210 | France | May 26, 1947 |